June 5, 1951 C. GERST 2,556,034
DRIVE ARRANGEMENT
Filed July 17, 1948 3 Sheets-Sheet 1
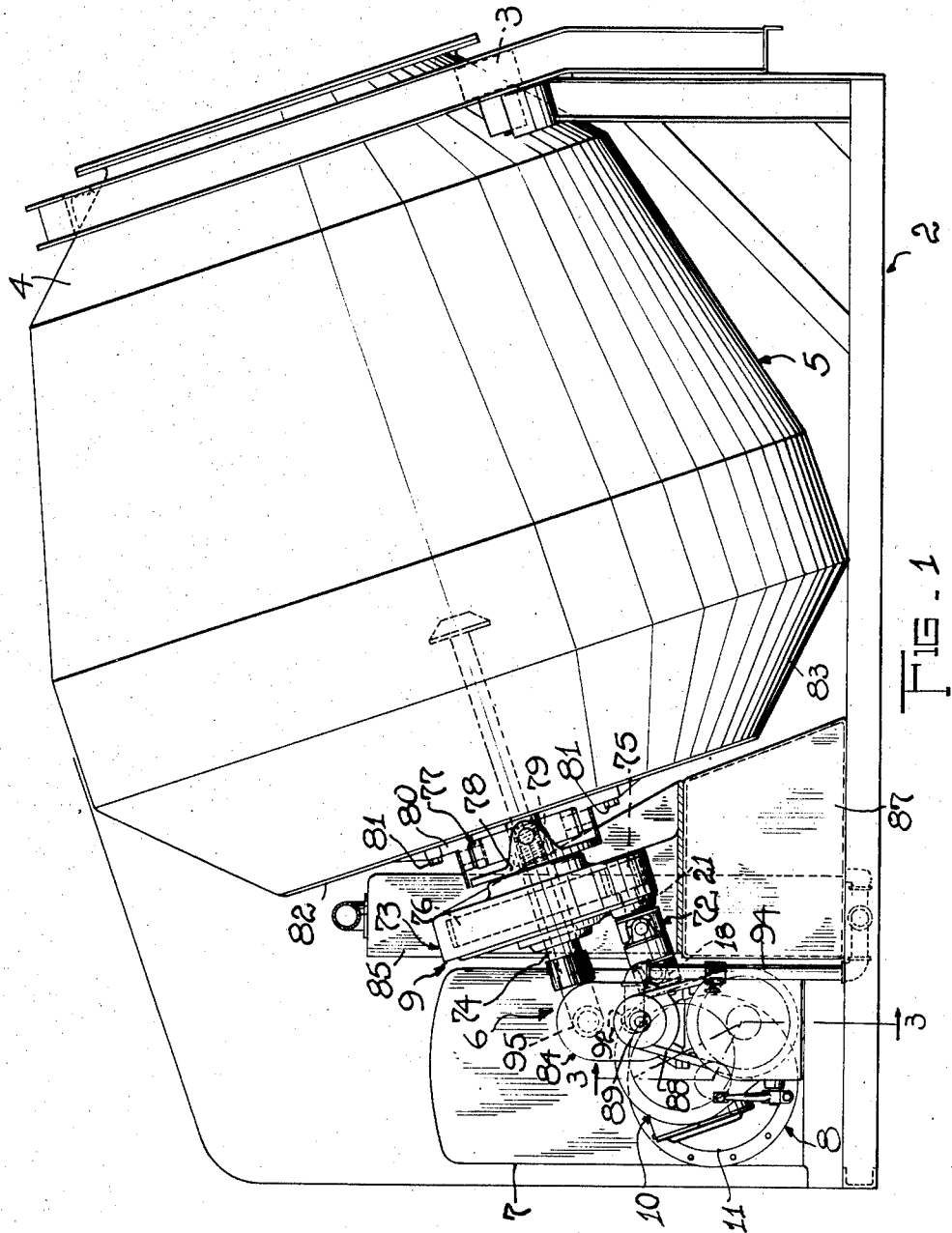
INVENTOR.
CHRIS GERST
BY
Gustav A. Wolff
ATT.

June 5, 1951  C. GERST  2,556,034
DRIVE ARRANGEMENT
Filed July 17, 1948  3 Sheets-Sheet 2
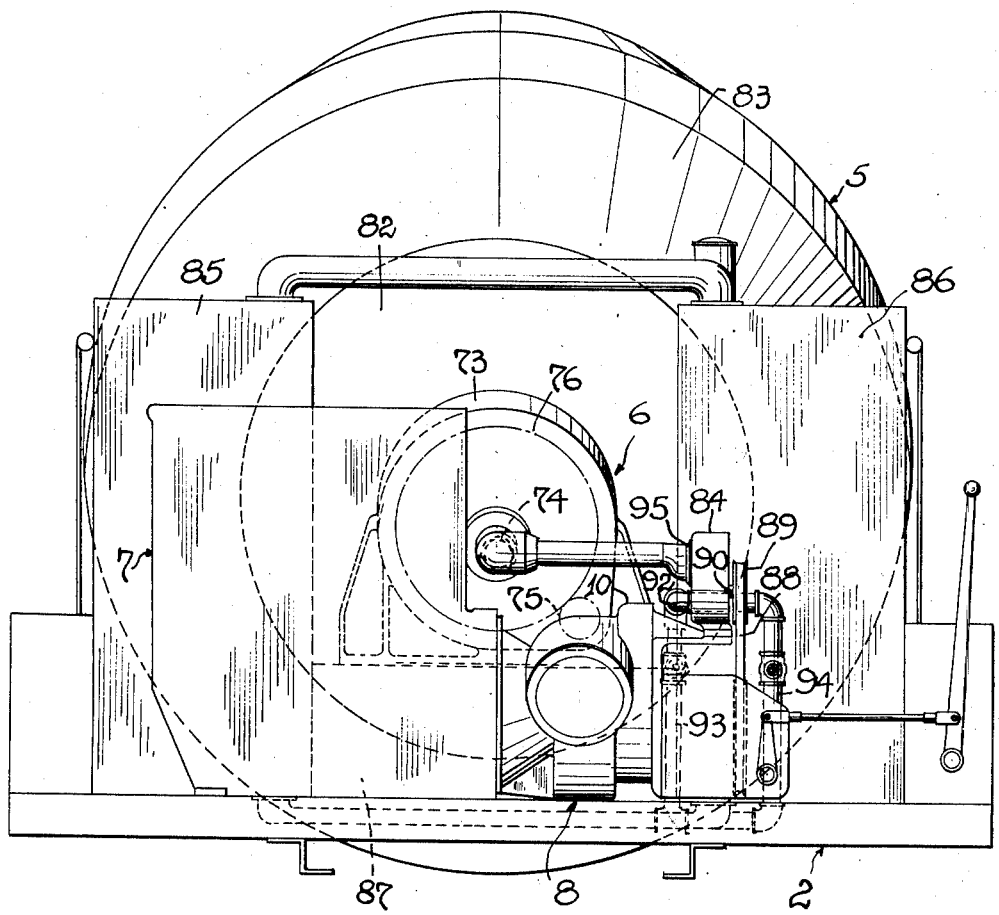
FIG_2
INVENTOR.
CHRIS GERST
BY
Gustav A. Wolff
ATT.

June 5, 1951  C. GERST  2,556,034
DRIVE ARRANGEMENT
Filed July 17, 1948  3 Sheets-Sheet 3
FIG_3
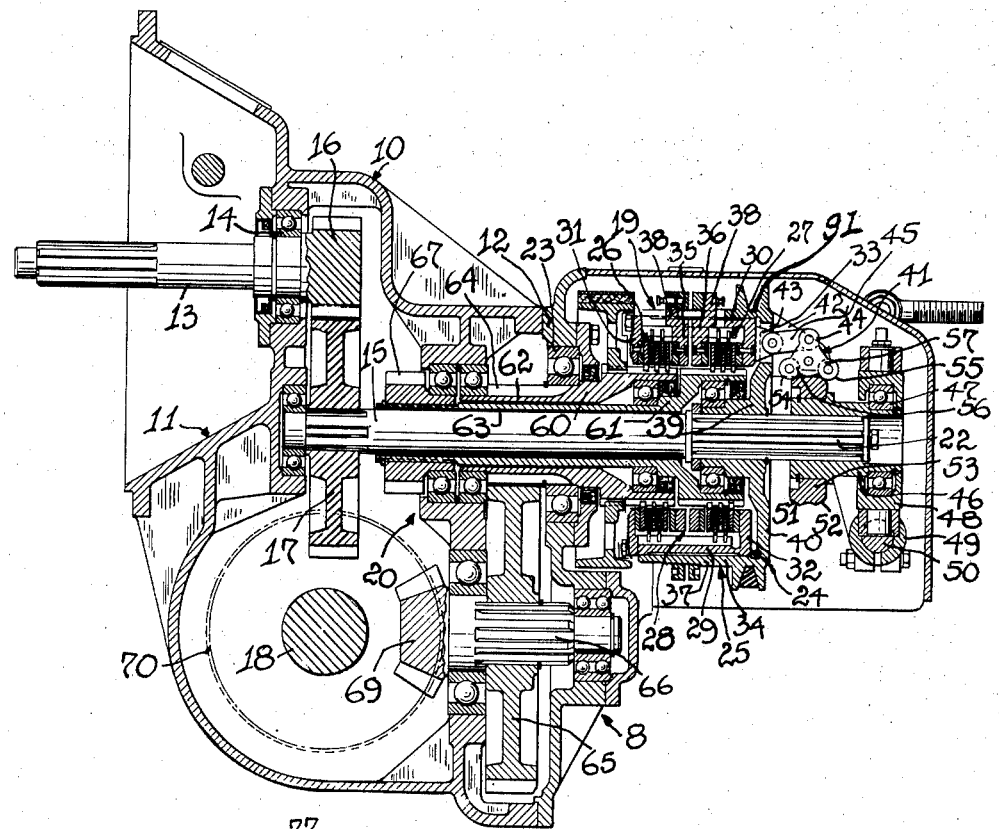
FIG_4
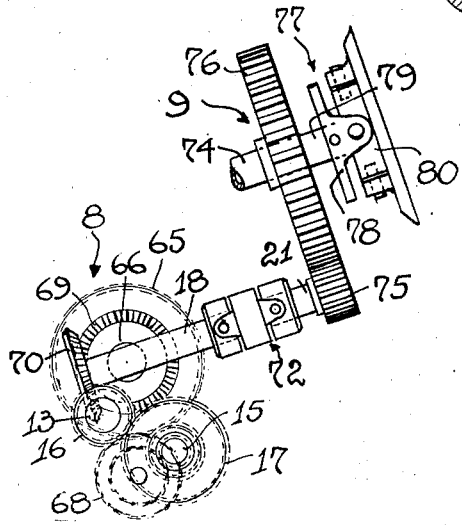
INVENTOR.
CHRIS GERST
BY
Gustav A. Wolff
ATT Patented June 5, 1951

2,556,034

UNITED STATES PATENT OFFICE 2,556,034

DRIVE ARRANGEMENT

Chris Gerst, Detroit, Mich., assignor to The Transmission & Gear Company, Dearborn, Mich., a corporation of Michigan Application July 17, 1948, Serial No. 39,351

5 Claims. (Cl. 259—177)

This invention relates to vehicles supporting individual rotary devices driven by individual power units and is particularly useful when incorporated in the drive of the rotary mixing drum of a concrete mixer—such as a truck mixer—by a power driven transmission, although the invention in its application is not limited to mixers but well suitable for use in all drives, including a power driven transmission and a rotary member to be driven by such transmission.

At present vehicles of this type, particularly truck mixers, include an individual power driven transmission system with a primary transmission and a secondary transmission resiliently coupled therewith, the secondary transmission being generally located in a bearing support for a bearing mounting the front end trunnion of the mixing drum and including an output shaft with a pinion meshing the customary ring gear at the front end of the mixing drum. This construction, outside of high costs, necessitates proper and close alignment of the front transmission bearing to effect proper engagement of the pinion and ring gear and subjects the transmission and bearing to excessive, undesired stresses whenever the frame structure of the vehicle yields, as for example, whenever the vehicle is travelling on rough roads.

The general object of the present invention is the provision of an improved drive arrangement for the generally inclined mixing drum of a concrete mixer or similar device, which drive arrangement includes a power transmission having its output shaft coupled with the front wall of the mixing drum by a single universal joint to directly drive the mixing drum and transfer the load of its front end portion by means of the universal joint and output shaft to the housing of the power transmission.

Another object of the invention is the provision of a front end support and axial drive for the rotary mixing drum of a truck mixer, which drive includes a power transmission having its output shaft aligned with the axis of the drum and coupled therewith by a single universal joint, one member of which is supported by said output shaft and the other member of which is attached to the front wall of the mixing drum in axial alignment therewith to axially support and drive such drum and transfer the load of its front end portion by means of the single universal joint and the output shaft to the housing of the power transmission.

A further object of the invention is the provision of a front end support and axial drive for the rotary mixing drum of a truck mixer, the support and drive including a transmission with a hollow output shaft extended at opposite sides through the housing of the transmission for unimpelled feeding of mixing and flushing water from customary sources through said output shaft and the common pipe and nozzle arrangements into the mixing drum, and the output shaft of the transmission being aligned with the axis of the mixing drum and coupled therewith by means of a single universal joint, one member of which is mounted on the exposed end portion of the output shaft and the other member of which is attached to the front wall of the mixing drum in axial alignment therewith to axially support and drive the mixing drum and transfer the load of its front end portion by means of the output shaft to the housing of the transmission.

Still another object of the invention is the provision of an axial drive and front end support for the rotary mixing drum of a truck mixer, which drive and support include primary and secondary transmissions universally coupled with each other, the primary transmission including a pump and the secondary transmission a hollow output shaft coupled with said pump for unimpelled feeding of mixing and flushing water from said pump to and through said output shaft and a common hose and nozzle arrangement into the mixing drum, with the output shaft of the secondary transmission axially aligned and coupled with the mixing drum by a single universal joint, one member of which is mounted on the exposed end portion of said output shaft and the other member of which is attached to the front wall of the mixing drum in axial alignment with respect thereto to effect an axial drive and support of the mixing drum and transfer the load of the front end portion of such mixing drum by means of the output shaft to the housing of the secondary transmission.

The above and additional objects and novel features of construction, combination and relations of parts by which the objects in view have been attained, will appear and are set forth in detail in the course of the following specification.

The drawings accompanying and forming part of the specification illustrate certain practical embodiments of the invention, but it will be apparent as the specification proceeds that the structure may be modified and changed in various ways without departure from the true spirit and broad scope of the invention.

In the drawings:

Fig. 1 is a side view of a mixing drum rotatably supported on a frame which mounts mixing drum drive and supporting means constructed in accordance with the invention.

Fig. 2 is a front view of the arrangement shown in Fig. 1; and

Fig. 3 is a section through the primary transmission of the drive means, the section being taken on line 3—3 of Fig. 1;

Fig. 4 is a diagrammatic view of the gearing of the mixing drum drive and supporting means.

Referring now more in detail to the exemplified form of the invention shown in the drawings, reference numeral 2 denotes the main frame of a concrete mixer, which frame freely rotatably supports on main rollers 3 the rear end 4 of a mixing drum 5. This mixing drum is driven and supported by a drive arrangement 6 embodying a motor unit 7, a primary transmission 8 and a secondary transmission 9 which is coupled with the mixing drum 5 in a manner later to be described.

Primary transmission 8 embodies a main housing 10 which includes at one end a bell housing 11 and at its other end is closed by a cover member 12. The housing 10 has extended thereinto an input shaft 13 coupled with the crank shaft (not shown) of motor unit 7 and mounted in ball bearings 14, which input shaft is coupled with a countershaft 15 by means of gears 16 and 17 and in turn is coupled with an output shaft 18 by a dual clutch structure 19 and gearing 20. The output shaft 18 is extended laterally from the main housing in an upwardly inclined plane for engagement with the input shaft 21 of the secondary transmission 9 as will be later described.

The dual friction clutch structure which is a dual friction clutch unit of the type disclosed in my copending applications — Serial No. 728,842 filed February 15, 1947, now Patent No. 2,551,939 dated May 8, 1951, and Serial No. 784,681 filed November 7, 1947—includes a pressure plate structure with axially spaced pressure plates, and a backing plate structure positioned between the pressure plates for cooperation of the pressure plate structure with the backing plate structure in selectively actuating clutch disk assemblies of the dual friction clutch unit by shifting the pressure plate structure in opposite directions. This clutch structure is mounted on the splined end portion 22 of countershaft 15 journaled in housing 10 and this splined end portion is extended outwardly through an opening 23 in cover member 12.

The dual friction clutch structure 19 embodies a pressure plate structure 24 and a backing plate structure 25 slidably and non-rotatably coupled with each other for selective coupling of countershaft 15 with gearing 20 by either one of two individual clutch disk assemblies 26 and 27 arranged within the pressure plate structure at opposite sides of backing plate means 28 of the backing plate structure.

The pressure plate structure 24 includes a cylindrical body member 29 with a slotted peripheral wall 30 and has its one end partly closed by a ring-shaped end plate 31 secured to the body member and its other end flanged inwardly to provide a flanged portion 32 opposite end plate 31. In addition body member 29 includes ear portions 33 integrally extended from the outside face of the flanged portion 32.

The backing plate structure 25 includes a cup-shaped body 34 adjustably mounting the backing plate means 28, consisting of backing plates 35 and 36, so as to be positioned between the ring-shaped end plate 31 and the flanged portion 32 of the pressure plate structure. In addition body 34 which has its peripheral wall 37 slidably engaged with the outer face of peripheral wall 30 and slotted in a manner similar to this wall for radial driving lugs 38 of the backing plates 35 and 36, is provided with an internally splined hub member 39, integrally extended from the end wall 40 of the body 34 and mounted on the splined end portion 22 of countershaft 15.

Actuation of the two clutch disk assemblies is effected by shifting pressure plate structure 24 in opposite directions by a plurality of dual clutch levers 41 which are pivoted in ear portions 42 extending from the body 34 of the backing plate structure adjacent to openings 43 in end wall 40. These dual clutch levers, each of which includes a third lever arm 44 linked by a link member 45 to the respective ear portion 33 on body member 29, are actuated by a shifting member 46 coupled by a ball bearing 47 with a throwout collar 48 which is actuated by a fork member 49 mounted on a shaft 50. This shifting member is slidably mounted on the splined end portion 22 of countershaft 15 and when shifted toward or away from the dual clutch structure engages the inclined surfaces 51 and 52 of its shifting ring 53 with rollers 54 and 55, respectively, on arms 56 and 57 of dual clutch levers 41 and thus effect tilting of these levers and therewith shifting of the pressure plate structure until either one of the clutch disk assemblies 26 and 27 is tightly gripped between the ring-shaped end plate 31 and backing plate 35, or between the flanged portion 32 and backing plate 36.

Clutch disk assemblies 26 and 27 include friction driving disks non-rotatably and axially shiftably engaged with the internally toothed peripheral wall 30 of body member 29, and friction driven disks non-rotatably and axially shiftably engaged with the enlarged splined end portions 60 and 61 of two axially aligned intersleeved tubular shaft 62 and 63, respectively. Tubular shaft 62 supports the friction driven disks of clutch disk assembly 26 and tubular shaft 63 supports the friction driven disks of clutch disk assembly 27 and these shafts are axially aligned with each other and the countershaft 15. The tubular shaft 62 is the forward drive shaft and meshes with its gear portion 64 a large gear 65 on a second countershaft 66, and the tubular shaft 63 is the reverse drive shaft and includes a pinion 67 coupled by a double idler gear 68 with the large gear 65 on countershaft 66. This latter countershaft mounts on its inner end a bevel gear 69 meshing a large bevel gear 70 on the output shaft 18 of the primary transmission, which output shaft is coupled with the input shaft 21 of the secondary transmission 9 by means of a universal joint coupling 72.

The secondary transmission embodies a housing 73 mounting input shaft 21 and a tubular shaft 74, the output shaft of the secondary transmission, which shaft extends at both ends through housing 73. Input shaft 21 mounts a small spur gear 75 meshing a large spur gear 76 mounted on tubular shaft 74 which is coupled with the mixing drum 5 by a large, single universal joint coupling 77, one member 78 of which is mounted on the outwardly extended end portion 79 of tubular shaft 74, and the other member 80 of which is attached by bolts 81 to the front wall 82 of mixing drum 5 in axial alignment therewith.

The single universal joint 77 effects a direct axial drive of mixing drum 5 by tubular shaft 74 and, in addition transfers the load of the front end 83 of the mixing drum to and through tubular shaft 74 to the housing 73 of the secondary transmission, which housing is properly re-inforced by ribs and supported on one of the water tanks of the concrete mixer later to be described.

The necessary mixing and flushing water is forced by a pump 84 from a plurality of water tanks 85, 86 and 87, into the mixing drum 5. This pump is mounted on main housing 10 of the primary transmission 8 and driven by a belt 88 coupling a pulley 89 on the pump shaft 90 with the body 34 of the backing plate structure 25, a belt groove 91 on the peripheral wall of said body serving to properly engage belt 88 with body 34. Pump 84 has its intake 92 connected by valve controlled pipes 93 and 94 with the two interconnected water tanks 85 and 86 and the flush-out water tank 87, the latter supporting and mounting housing 73 of secondary transmission 9, and has its outlet 95 coupled with tubular shaft 74 to force mixing or flushing water from said tanks through shaft 74 and the customary pipe and nozzle arrangement coupled therewith into the mixing drum.

The described axial drive and front end support for the rotary mixing drum of a truck mixer is substantially less in weight than presently used drives of this type, is shorter in over-all length to permit mounting of the drive and mixing drum in proper position on a truck for best traction and steering of such truck, is constructed to stand up under adverse conditions and can readily and easily be repaired at low expense.

Having thus described my invention:
What I claim is:

1. In a support and drive arrangement for the mixing drum of a concrete mixer, a horizontally arranged, stationary frame structure, a mixing drum mounted in axially-inclined relation on said frame, said frame structure including at its one end rotatable means axially non-shiftably and freely rotatably supporting the front end of said mixing drum, driving means for said mixing drum including a motor driven reversible power transmission and a secondary transmission adjacent to said power transmission yieldingly coupled therewith, said two transmissions being mounted adjacent to each other on the other end of said frame opposite the end wall of the rear end of the mixing drum and said secondary transmission including a housing rotatably mounting an output shaft extended outside of such housing in substantial axial alignment with the axis of said inclined mixing drum, and a single universal joint including two members directly coupled with said output shaft and the said rear end wall of said mixing drum to axially drive said mixing drum and support the rear end thereof by said secondary transmission.

2. A support and drive arrangement for the mixing drum of a concrete mixer as described in claim 1, having a tubular output shaft for said secondary transmission and including water pumping means with an outlet coupled with one end of said tubular output shaft, and tubular water discharge means arranged within said mixing drum and extended outwardly therefrom through its rear wall in substantially symmetrical arrangement with respect to said universal joint, said water discharge means being coupled with said tubular output shaft to permit feeding of water from said water pumping means through said output shaft and universal joint axially into said mixing drum.

3. A support and drive arrangement for the mixing drum of a concrete mixer as described in claim 2, including a water tank supported on said stationary frame structure and mounting said secondary transmission, and an intake pipe connection between said water tank and said water pumping means.

4. In a support and drive arrangement for the mixing drum of a concrete mixer with an axially inclined mixing drum, a frame member axially non-shiftably supporting the front end of said mixing drum, transmission means on said frame member including a tubular output shaft extended through opposite sides of said transmission means and in substantial axial alignment with the axis of said mixing drum, a single universal joint coupling said tubular output shaft with the rear wall of said mixing drum for driving and supporting said drum, pumping means having an outlet connected with one end of said tubular shaft, and water discharge means in said mixing drum extended through the said rear wall and universal joint, said water discharge means being yieldingly coupled with the other end of said tubular shaft to permit feeding of water from said pump through the output shaft, the universal joint and the water discharge means into the mixing drum.

5. In a support and drive arrangement for the mixing drum of a concrete mixer, a horizontally arranged, stationary frame structure, a mixing drum mounted on said frame, said frame structure including at its one end rotatable means axially non-shiftably and freely rotatably supporting the front end of said mixing drum, driving means for said mixing drum including a motor driven reversible power transmission and a secondary transmission adjacent to said power transmission yieldingly coupled therewith, said two transmissions being mounted adjacent to each other on the other end of said frame opposite the end wall of the rear end of the mixing drum and said secondary transmission including a housing rotatably mounting an output shaft extended outside of such housing in substantial axial alignment with the axis of said mixing drum and a yielding, flexible coupling connecting said output shaft with the rear wall of said mixing drum axially thereof, said yielding coupling including one member mounted on said output shaft and another member attached to the rear end wall of said mixing drum to axially drive said mixing drum and support its rear end by the said secondary transmission.

CHRIS GERST.

REFERENCES CITED

The following references are of record in the file of this patent:

UNITED STATES PATENTS

| Number | Name | Date |
| --- | --- | --- |
| 1,475,904 | Vandenplas | Nov. 27, 1923 |
| 1,967,097 | McCrery | July 17, 1934 |
| 1,999,843 | McCrery | Aug. 30, 1935 |
| 2,029,126 | Rybeck | Jan. 28, 1935 |
| 2,415,989 | Bohmer | Feb. 18, 1947 |
| 2,447,071 | Huffman | Aug. 17, 1948 |